United States Patent
Kayyoor (10) Patent No.: US 11,620,285 B2
(45) Date of Patent: Apr. 4, 2023

(54) AUTOMATIC DATABASE QUERY TRANSLATION

(71) Applicant: ServiceNow, Inc., Santa Clara, CA (US)

(72) Inventor: Ashwin Kumar Kayyoor, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/470,414

(22) Filed: Sep. 9, 2021

(65) Prior Publication Data

US 2023/0076510 A1    Mar. 9, 2023

(51) Int. Cl.
*G06F 16/2452* (2019.01)
*G06F 16/2455* (2019.01)
*G06F 16/27* (2019.01)
*G06F 16/22* (2019.01)

(52) U.S. Cl.
CPC .... *G06F 16/24522* (2019.01); *G06F 16/2246* (2019.01); *G06F 16/24556* (2019.01); *G06F 16/27* (2019.01)

(58) Field of Classification Search
CPC ........... G06F 16/24522; G06F 16/2246; G06F 16/24556; G06F 16/27
See application file for complete search history.

(56) References Cited

U.S. PATENT DOCUMENTS

2014/0297611 A1 * 10/2014 Abbour .............. G06F 16/2343 707/703
2019/0188309 A1 *  6/2019 Anderson .............. G06F 3/065

FOREIGN PATENT DOCUMENTS

| CN | 111143403 A  * | 5/2020 | ......... G06F 16/2433 |
| WO | WO-2016069013 A1 * | 5/2016 | ............. G06F 17/30 |
| WO | WO-2018100417 A1 * | 6/2018 | |

OTHER PUBLICATIONS

Vinju, Analysis and transformation of source code by parsing and rewriting, pp. 1-230 (Year: 2004).*

* cited by examiner

*Primary Examiner* — Albert M Phillips, III
(74) *Attorney, Agent, or Firm* — Van Pelt, Yi & James LLP (57) ABSTRACT

A database query is received at a primary database in a query language of the primary database. A determination is made whether the database query is to be handled by a secondary database different from the primary database but storing synchronized records of at least a portion of the primary database. In response to determining that the database query is to be handled by the secondary database, the database query is translated to a query language of the secondary database, including by determining a tree data structure representation of the database query, translating one or more elements of the tree data structure representation, and synthesizing the tree data structure representation to automatically generate the database query in the query language of the secondary database. The automatically generated database query is provided in the query language of the secondary database to the secondary database.

18 Claims, 7 Drawing Sheets

AUTOMATIC DATABASE QUERY TRANSLATION

BACKGROUND OF THE INVENTION

Cloud service platforms allow a business to host a network accessible service with many benefits over a traditional software application including increased accessibility and availability. Unlike traditional applications, such as desktop applications, customers can access the services from a variety of network clients often with only minimal limitations on the client. Cloud-based services also offer improved flexibility. For example, the services can be updated and deployed under the guidance and control of the service provider. With cloud-based services, persistent state is often required due to their network and distributed nature. Many cloud services rely on one or more forms of data storage for storing persistence information. Often, cloud services will utilize a database service for storing persistent data. Databases, including relational databases, allow an application to store and subsequently query a diverse and large dataset. For example, these databases can be used to store and retrieve data such as customer and application data. As cloud services become increasingly complex and feature rich, the amount and complexity of the dataset and dataset relationships can increase. Demand for increased performance and availability of the data tier of the cloud service can also increase.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A dynamic database compatibility layer is disclosed. Using the disclosed techniques, a database query directed to a database can be translated and directed to an alternative and synchronized database to improve the data access response. For example, a database query written in a specific database query language can be translated to a different query language or dialect and redirected to a different database with synchronized records of the relevant data. The redirected query is processed by the alternative database which can process the query in a more optimal manner. In various embodiments, the compatibility layer determines which database queries should be redirected to different databases and automatically translates the query to a format compatible with the determined alternative database. By storing portions of data using different databases and providing database responses using the more efficient database for a query, the overall performance of database operations from a database service standpoint is significantly improved. For example, a replicated row-store database can be utilized when row-store efficient operations are required, and a replicated database using a column-store format can be utilized when column-store efficient operations are required.

In some embodiments, a primary database receives a database query in a query language of the primary database. For example, a compatibility layer and/or a primary database receives a SQL query written in the query language or dialect supported by the primary database. The primary database may, for example, store data optimized for row-based operations. A determination is made whether the database query is to be handled by a secondary database different from the primary database but storing synchronized records of at least a portion of the primary database. For example, a secondary database is configured to replicate a portion of the records stored in the first database. In some scenarios, the secondary database can perform certain database queries more efficiently than the first database. For example, the secondary database may store data optimized for column-based operations and can respond to certain complex analytical queries more efficiently than the first database. In response to determining that the database query is to be handled by the secondary database, the database query is translated to a query language of the secondary database. For example, the database query originally targeting the primary database is translated to a database query language supported by the secondary database. In various embodiments, the translated database query language may be a SQL dialect supported by the secondary database and not the primary database.

In some embodiments, translating the database query to a query language of the secondary database includes determining a tree data structure representation of the database query. For example, the original query is analyzed to determine a tree representation of the query, such as an abstract syntax tree of the query. One or more elements of the tree data structure representation are translated, and the tree data structure representation is synthesized to automatically generate the database query in the query language of the secondary database. For example, elements of the tree data structure corresponding to query syntax that requires translation are identified as requiring translation. The query is then synthesized and automatically generated in the target language. For example, when the translated query is synthesized, elements that do not require translation are outputted in their unmodified format and elements that do require translation are translated. Once generated, the automatically generated database query is provided in the query language of the secondary database to the secondary database. This allows the secondary database, which is the database that is most efficient in servicing the query, to respond to the query. In various embodiments, the performance gains using the disclosed technique are significant, exhibiting performance improvements by a factor of over 10,000 for certain types of queries.

Figure 1:
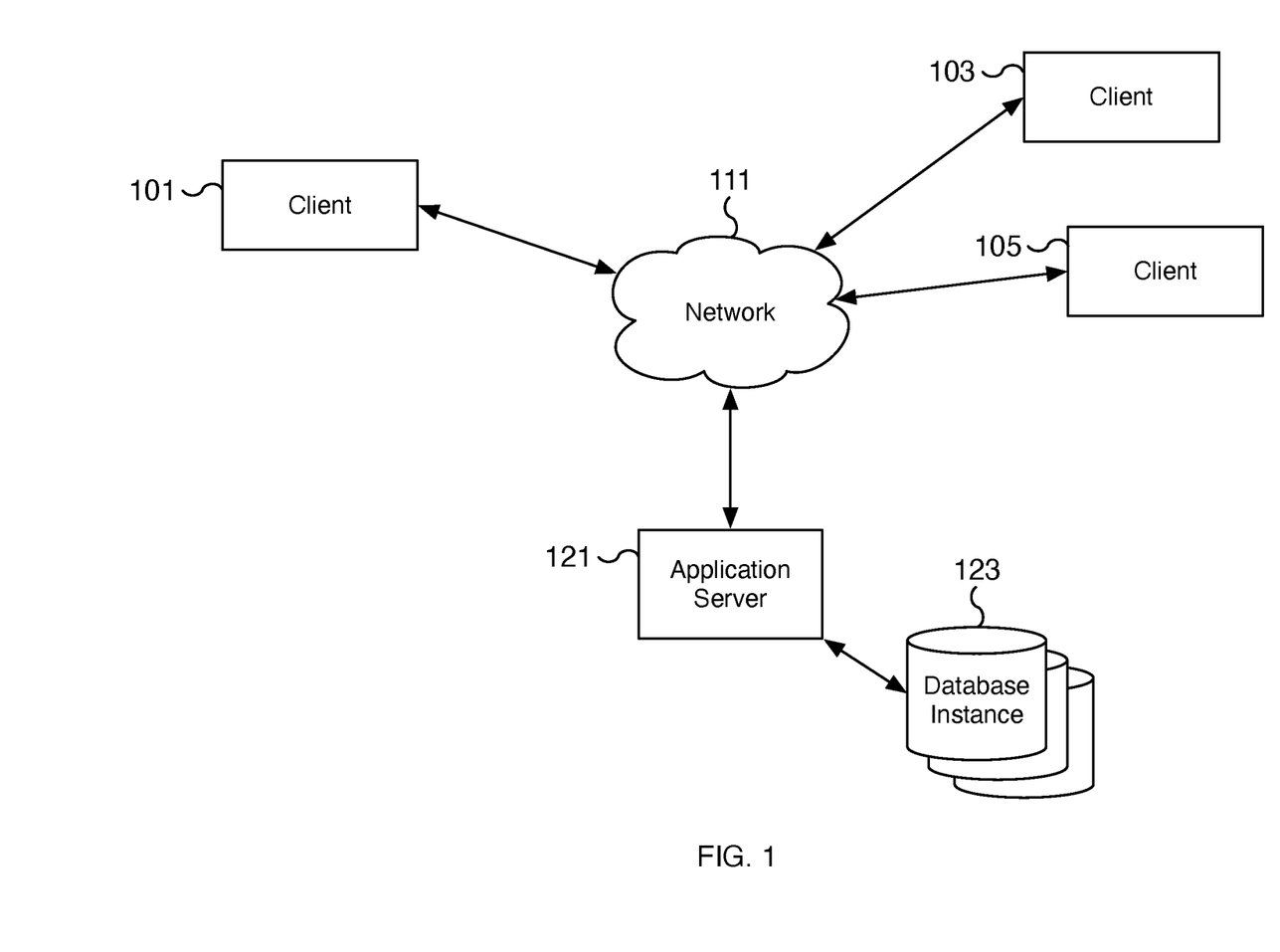
FIG. 1 is a block diagram illustrating an example of a network environment of a database-backed cloud service that supports the automatic translation of database queries.

FIG. 1 is a block diagram illustrating an example of a network environment of a database-backed cloud service that supports the automatic translation of database queries. In the example shown, clients 101, 103, and 105 access cloud-based services hosted by application server 121 via network 111. Network 111 can be a public or private network. In some embodiments, network 111 is a public network such as the Internet. In various embodiments, clients 101, 103, and 105 are network clients such as web browsers for accessing web services. Application server 121 provides web services including web applications such as web-based configuration management database (CMDB) services. Application server 121 utilizes database instance 123 for storing and retrieving data. For example, data is written to and retrieved from database instance 123. In various embodiments, database instance 123 is composed of multiple databases including a primary database and at least one secondary database. In some embodiments, database instance 123 includes multiple secondary databases, such as two, three, or more secondary databases in addition to a primary database. Each database of database instance 123 may be optimized for different workloads and at least a portion of the database records are synchronized with the other databases of database instance 123. For example, a first secondary database of database instance 123 keeps synchronized records with the primary database of database instance 123. In some embodiments, the primary and/or secondary databases are relational databases but utilize different storage and retrieval techniques. For example, the primary database may be optimized for row-based operations and a secondary database may be optimized for column-based operations. In various embodiments, database instance 123 responds to database queries originating from application server 121 that are provided in the query language of the primary database. SQL queries directed to any of the secondary databases are translated to the SQL language or dialect of the secondary database from the SQL language used by the primary database.

In some embodiments, cloud-based services can be implemented by pairing application server 121 and database instance 123. Application server 121 can utilize database instance 123 to provide certain services. For example, database instance 123 can function as a configuration management database (CMDB) used by application server 121 for providing CMDB services. Among other information, database instance 123 can store configuration information related to managed assets, such as related hardware and/or software configurations. In some embodiments, database instance 123 is a persistent computer storage that is network accessible and used to store and query customer data. In various embodiments, database instance 123 can be utilized to store customer information for one or more different customers. In the example shown, database instance 123 is shown with multiple cascaded database symbols to indicate that database instance 123 includes a primary database and one or more secondary databases. From the perspective of a database client, such as from the perspective of application server 121, database instance 123 responds to database requests compatible with the primary database of database instance 123. For example, database instance 123 responds to SQL queries in the SQL language of the primary database of database instance 123, regardless of whether the actual SQL query request is served by a primary or secondary database of database instance 123.

In some embodiments, database instance 123 includes multiple database components (not shown) including a compatibility layer, a primary database, a primary database storage, at least one secondary database, and corresponding secondary database storages for each secondary database. Database instance 123 responds to SQL commands composed in the SQL language or dialect of the primary database. In various embodiments, the compatibility layer (not shown) of database instance 123 will direct a SQL command to the appropriate database. In the event the selected database is not the primary database, the compatibility layer translates the SQL command into the SQL language or dialect of the selected secondary database. Once the SQL command is executed by the selected database, the appropriate results are returned to the database client, such as application server 121. In various embodiments, the database storages of the various databases of database instance 123 keep synchronized records. For example, a query redirected to a secondary database returns the same results as if the query were executed by the primary database.

Although single instances of some components have been shown to simplify the diagram, additional instances of any of the components shown in FIG. 1 may exist. For example, application server 121 may include one or more servers. Similarly, database instance 123 may include one or more database instances and may not be directly connected to application server 121. For example, database instance 123 and its components may be replicated and/or distributed across multiple servers and/or components. In some embodiments, components not shown in FIG. 1 may also exist.

Figure 2:
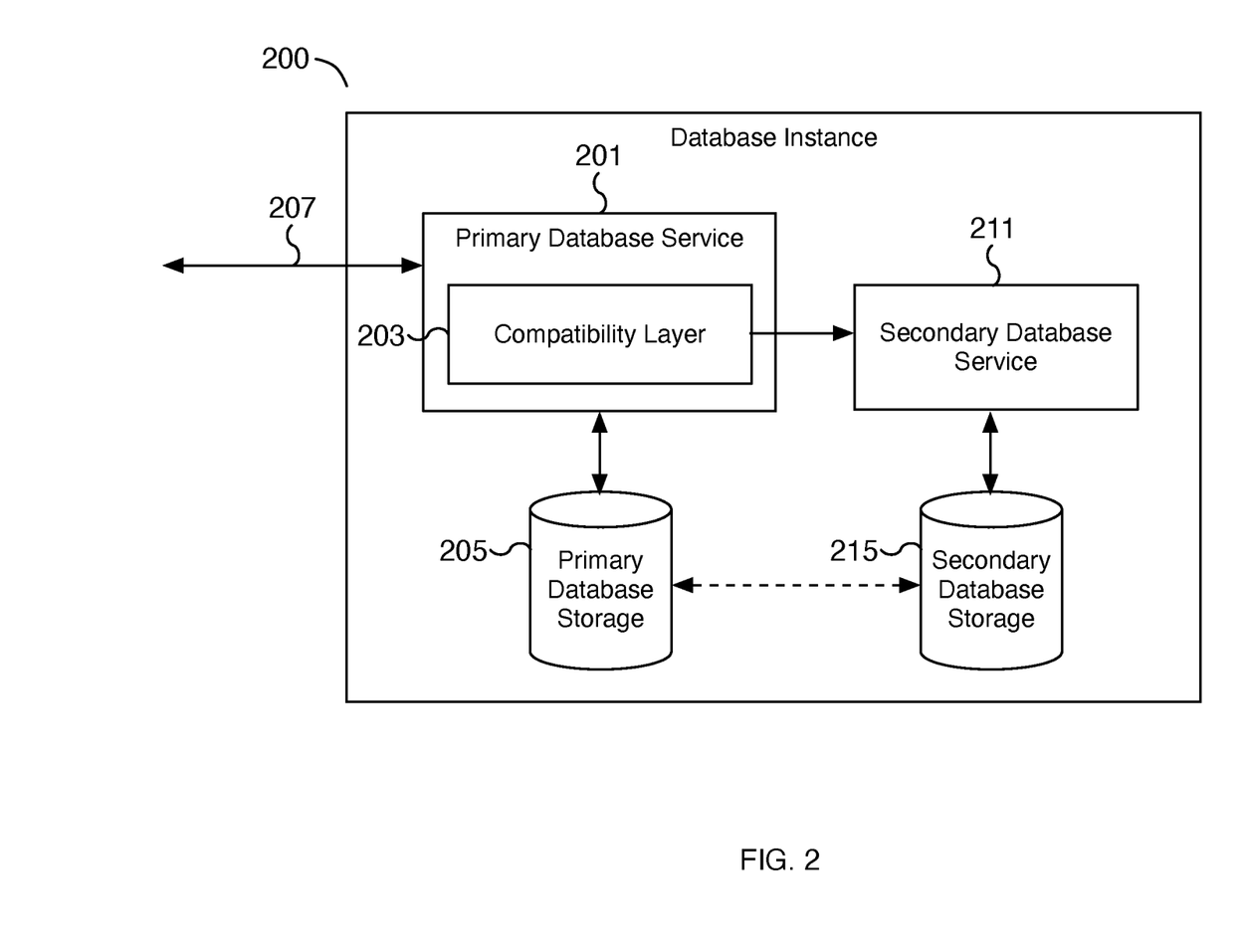
FIG. 2 is a block diagram illustrating an example of a database instance that supports the automatic translation of database queries.

FIG. 2 is a block diagram illustrating an example of a database instance that supports the automatic translation of database queries. In the example shown, database instance 200 includes primary database service 201, compatibility layer 203, primary database storage 205, network connection 207, secondary database service 211, and secondary database storage 215. In various embodiments, database instance 200 functions as the backend database of one or more cloud services such as the services described with respect to FIG. 1. In some embodiments, database instance 200 is database instance 123 of FIG. 1 and network connection 207 communicatively connects database instance 200 to application server 121 of FIG. 1. Although shown with a single secondary database and corresponding secondary database storage, in various embodiments, additional secondary databases and their corresponding database storages can exist. In some embodiments, database instance 200 functions as a configuration management database (CMDB). The dotted arrow between primary database storage 205 and secondary database storage 215 indicates that the two database storages synchronize at least a portion of their database records. For example, secondary database storage 215 may synchronize a subset of the database records of primary database storage 205. The synchronized records can be stored in a different storage format on and/or retrieved using different techniques from secondary database storage 215 when compared to primary database storage 205.

In some embodiments, primary database service 201 on behalf of database instance 200 receives incoming database requests via network connection 207. Compatibility layer 203 analyzes the request and determines whether the request should be handled by primary database service 201 or secondary database service 211. In various embodiments, primary database service 201 and secondary database service 211 are database services that respond to database requests received in their respective SQL languages. For example, primary database service 201 and secondary database service 211 can each utilize a different SQL language, SQL dialect, and/or version of a database query language. In some embodiments, primary database service 201 and secondary database service 211 support different features and/or utilize different database insertion, update, and retrieval techniques, for example, to access database records. Due to their differences, one of the database services may be more suited for executing the query. For example, a request executed on one database service may be executed faster and/or more efficiently than the same request executed on the other database service.

In the example shown, primary database service 201 and secondary database service 211 each utilize their own corresponding database storages, primary database storage 205 and secondary database storage 215, respectively, for servicing a SQL request. For example, primary database storage 205 and secondary database storage 215 each store database data, such as database records, in their respective formats and/or data structures. In some embodiments, primary database storage 205 can store and utilize data in a row-store format and secondary database storage 215 can store and utilize data in a column-store format, or vice versa. Other storage formats, including hybrid formats, are appropriate as well. In some embodiments, for synchronized database records, updates to the data of one database storage are replicated to the other database storage. For example, an update to database records in secondary database storage 215 is replicated for the corresponding synchronized records in primary database storage 205.

In various embodiments, compatibility layer 203 determines which of the database services should respond to an incoming database request. Multiple factors can be considered by compatibility layer 203 when analyzing the request to determine which database service (primary database service 201 or secondary database service 211) should service the incoming request. In the event compatibility layer 203 determines that secondary database service 211 should service an incoming request, compatibility layer 203 translates the request from the SQL language of primary database service 201 to the SQL language of secondary database service 211. In various embodiments, the translation involves creating a tree representation of the query and assigning rewrite hooks to the nodes of the query tree. Depending on the SQL language of secondary database service 211, only the appropriate rewrite hooks are enabled. To complete the translation, the query tree is traversed, and the enabled rewrite hooks are applied to translate the query components of their respective nodes when encountered during the traversal. Once translated, compatibility layer 203 forwards the translated request to secondary database service 211, where the request is executed and a result returned. In the event compatibility layer 203 determines that primary database service 201 should service the incoming request, no translation is necessary and primary database service 201 executes and returns a result. In some embodiments, multiple secondary databases exist (not shown) and depending on the SQL language of each secondary database, different rewrite hooks are assigned and/or enabled at each node of the query tree.

Although single instances of some components have been shown to simplify the diagram of database instance 200, additional instances of one or more of the components shown in FIG. 2 may exist. For example, database instance 200 may include multiple instances of primary database service 201 and/or secondary database service 211, for example, to process multiple requests in parallel. Database instance 200 may also include multiple distributed (and/or replicated) database storages corresponding to multiple instances of primary database storage 205 and/or secondary database storage 215. Although compatibility layer 203 is shown as part of primary database service 201, in some embodiments, compatibility layer 203 exists outside of primary database service 201 but as part of database instance 200. For example, instead of primary database service 201 first receiving an incoming request, compatibility layer 203 can receive the incoming request and route the request to either primary database service 201 or secondary database service 211. In some embodiments, components of database instance 200 not shown in FIG. 2 may also exist.

Figure 3:
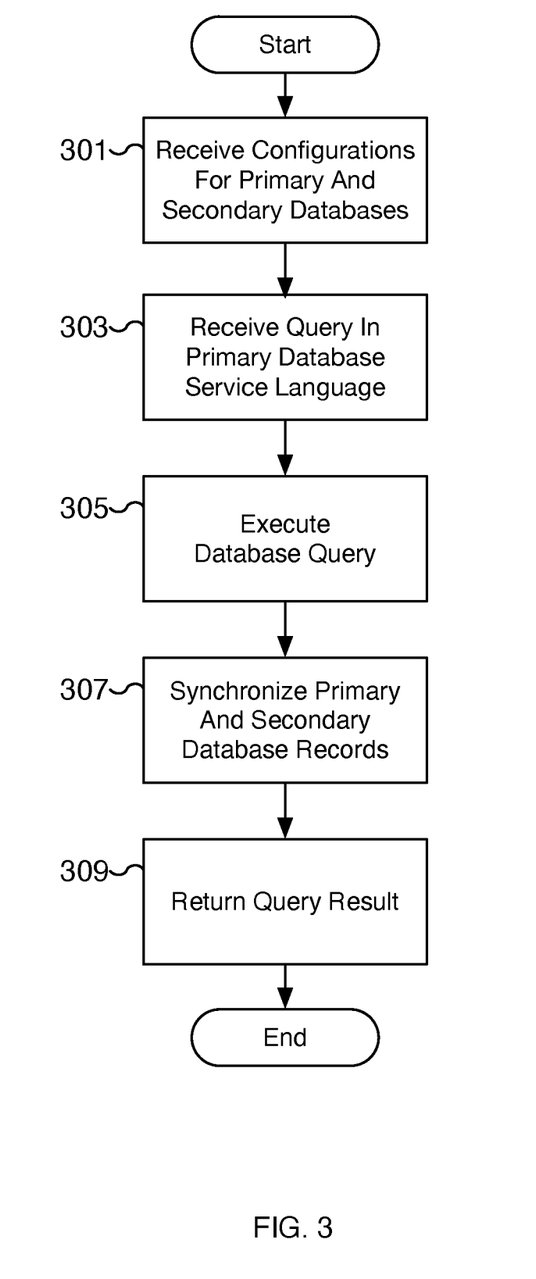
FIG. 3 is a flow chart illustrating an embodiment of a process for configuring and utilizing a database instance that supports the automatic translation of database queries and multiple database services.

FIG. 3 is a flow chart illustrating an embodiment of a process for configuring and utilizing a database instance that supports the automatic translation of database queries and multiple database services. Using the process of FIG. 3, a database-backed cloud service can utilize a database instance that supports the automatic translation of database queries and multiple database services to improve the efficiency of the cloud-based application. For example, utilizing the process of FIG. 3, the response time of and/or performance impact associated with database requests can be significantly improved by directing different queries to different database services of the database instance. In some embodiments, the process of FIG. 3 is applied to a database instance with a primary database service and one or more secondary database services. Although the process of FIG. 3 is described with respect to a database instance with a single primary and a single secondary database service, the same techniques apply when multiple secondary database services are supported by the database instance. In some embodiments, the database instance is database instance 123 of FIG. 1 and/or database instance 200 of FIG. 2. In some embodiments, the primary database service is primary database service 201 of FIG. 2 and the secondary database service is secondary database service 211 of FIG. 2. In some embodiments, the database-backed cloud service is hosted by application server 121 of FIG. 1.

At 301, the configurations for primary and secondary databases are received at the database instance. For example, the primary and secondary databases are configured for servicing database requests. In some embodiments, the configuration includes determining what type of database service to run as a primary database service and as a secondary database service along with their corresponding database storages. In some embodiments, the configuration further includes identifying which database records should be synchronized across the two database services. For example, a subset of database records of the primary database service can be identified and replicated on the secondary database service as synchronized database records. Any updates to the synchronized database records by either of the database services result in updates to the corresponding records on the other database service. The synchronization allows database queries that include the synchronized database records to return the same results regardless of which database service services the database query. In some embodiments, the configuration includes configuring the database storages including enabling and/or disabling features to optimize the different database services.

In some embodiments, the configuration includes configuring a rule set used for performing the translation of database requests from the primary database service language to the secondary database service language. For example, a translation rule set can identify which components of a query require translation. In various embodiments, a database query is made up of multiple components and some query components are compatible across both database services and do not require translation. However, a subset of query components may exist that are not compatible between database services and require translation before the secondary database service can execute the query. In various embodiments, the rule set is used to identify and enable for translation the nodes of a query tree with query components that require translation. In some embodiments, the rule set configuration is associated with rewrite hooks that are applied to translate a query component from the primary database service language to the secondary database service language.

At 303, a database query is received in the primary database service language. For example, a database instance receives a database query where the query is formatted in the database query language of the primary database service language. From the perspective of the database client, the database instance need only understand and communicate using the language of the primary database service language.

At 305, the database query is executed. For example, the database query is processed and executed by one of the database services of the database instance. In the event the secondary database service is used to execute the query, the query is first translated from the language of the primary database service to the language of the secondary database service. In the event the primary database service is used to execute the query, no translation is necessary. In some embodiments, a compatibility layer of the database instance determines which database service should service the request and performs the query translation if required.

At 307, primary and secondary database records are synchronized. For example, modifications to any synchronized database records resulting from executing the database query at 305 are replicated to maintain consistency across the database services. By maintaining data consistency among the synchronized database records, subsequent queries can be serviced from either the primary or secondary database service.

At 309, the query result is returned. For example, the results from executing the query at 305 are returned. In some embodiments, the results are returned via the primary database service after translating and routing the query to the secondary database service. In various embodiments, the results are provided to the database client as if the query was executed by the primary database service. In some embodiments, the results may be transformed into a format that the primary database service utilizes. For example, the results from the secondary database service are translated to a format utilized by the primary database service in the event the two database services provide results in different formats.

Figure 4:
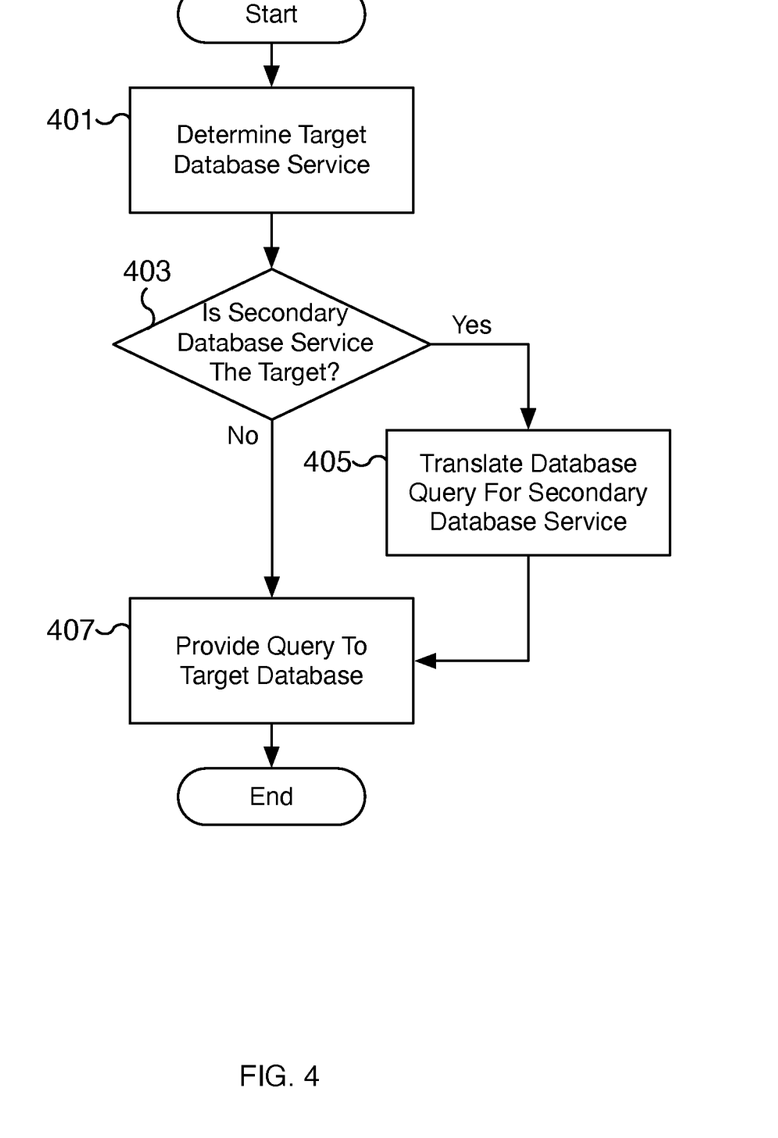
FIG. 4 is a flow chart illustrating an embodiment of a process for receiving and routing a database query to multiple database services.

FIG. 4 is a flow chart illustrating an embodiment of a process for receiving and routing a database query to multiple database services. Using the process of FIG. 4, a database instance with a compatibility layer that automatically translates database queries can support multiple database services, each with its own performance and/or resource tradeoffs. For example, utilizing the process of FIG. 4, different database queries can be directed to a primary database service or a secondary database service of the database instance. The primary database service can be optimized for certain types of database queries while the secondary database service can be optimized for other types of database queries. Although the process of FIG. 4 is described with respect to a database instance with a single primary and a single secondary database service, the same techniques apply when multiple secondary database services are supported by the database instance. In some embodiments, the database instance is database instance 123 of FIG. 1 and/or database instance 200 of FIG. 2. In some embodiments, the primary database service is primary database service 201 of FIG. 2, the secondary database service is secondary database service 211 of FIG. 2, and the compatibility layer is compatibility layer 203 of FIG. 2. In some embodiments, the database-backed cloud service that utilized the database instance is hosted by application server 121 of FIG. 1.

At 401, a target database service is determined. For example, a compatibility layer of the database instance analyzes an incoming database request such as a database query. The analysis of the request can determine which of the available database services of the database instance is most appropriate for servicing the request. In some embodiments, the type of the request is used to determine the target database service. For example, a response time of the request can be estimated for each database service to determine which database service should be selected as the target database service. In some embodiments, the database service with the fastest predicted response time is selected as the target database service. Other factors can be utilized in the analysis as well, including the current and/or expected load of the different database services. For example, the expected resource load for executing the incoming database request by each database service can be compared. In various embodiments, a compatibility layer selects either the primary database service or the secondary database service as the target database service.

In some embodiments, a query is analyzed by the compatibility layer to determine whether the query is an analytical query. Analytical queries can be directed to the database service that utilizes a column-store format. For example, a query that utilizes aggregate functions such as count, multiply, and sum, can be directed to the database service that utilizes a column-store format for significantly improved performance when compared to a row-store database service. In contrast, a database query that does not use aggregate functions can be directed to a database service that doesn't use a column-store format such as a row-store database service. Similarly, in some embodiments, the query is analyzed by the compatibility layer to determine the number of projections of the query. A query with many projections can be directed to the database service that utilizes a row-store format. In some embodiments, a secondary database service is selected as a target database service when the query references synchronized database records. For example, a query that accesses a synchronized record is routed to the secondary database with the synchronized data records. In various embodiments, other analysis factors are appropriate as well.

At 403, a determination is made whether the secondary database service is the target database service. In the event the secondary database service is the target database service, processing proceeds to step 405 where the database query can be translated into the language of the secondary database service. In the event the secondary database service is not the target database service, processing proceeds to step 407. For example, the primary database service is the target database service instead of the secondary database service and no database query translation is needed.

At 405, the database query is translated for the secondary database service. For example, the incoming database query is received by the database instance in the language of the primary database service and is translated by the compatibility layer into the language of the secondary database service. Although both the primary and secondary database services support database query languages, the languages supported by each database service can differ and the database query may not be compatible with the secondary database service without translation. At 405, the database query is translated for the secondary database service by creating a tree representation of the incoming query and assigning rewrite hooks to the nodes of the query tree. Based on the supported query language of the secondary database service, only the appropriate rewrite hooks are enabled. To complete the translation, the query tree is traversed, and the enabled rewrite hooks are applied to translate the query components of their respective nodes when encountered during the traversal. A translated version of the database query is provided at step 407.

At 407, the database query is provided to the target database service. For example, in the event the primary database service is the target database service, the original database query is provided for execution. Similarly, in the event the secondary database service is the target database service, the translated database query is provided for execution. In either scenario, the target database service is provided with a query for execution in the query language compatible with the database service.

Figure 5:
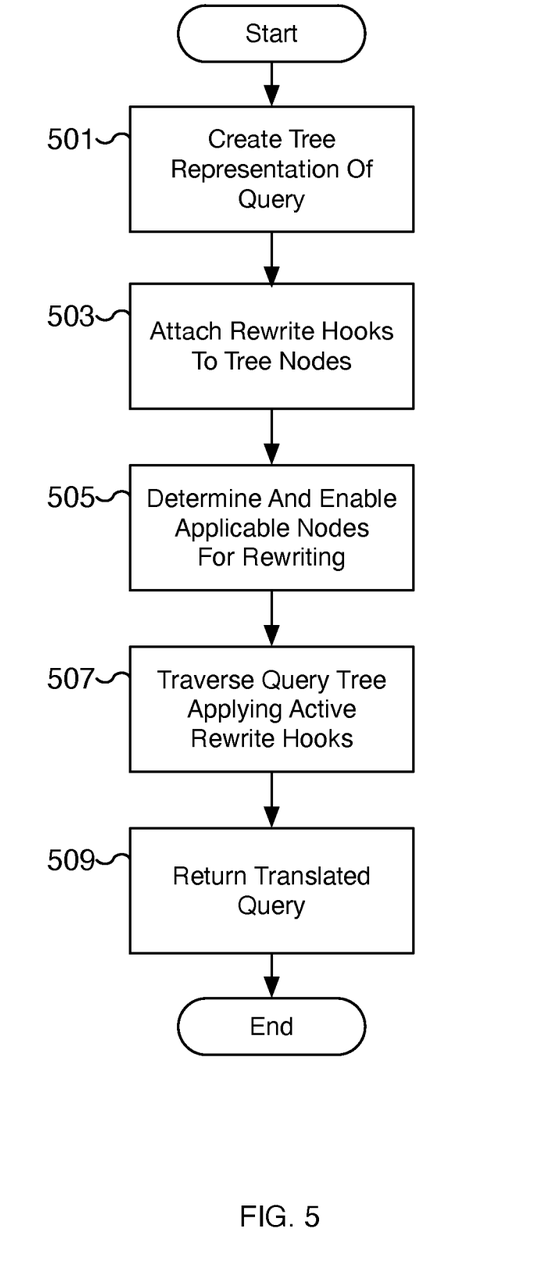
FIG. 5 is a flow chart illustrating an embodiment of a process for translating a database query between different database query languages.

FIG. 5 is a flow chart illustrating an embodiment of a process for translating a database query between different database query languages. Using the process of FIG. 5, a compatibility layer of a database instance can receive a database query in a primary database service language and translate the query into a secondary database service language. The translated query can then be routed and serviced by the secondary database service. In some embodiments, the process of FIG. 5 is performed at 405 of FIG. 4 by a database instance such as database instance 123 of FIG. 1 and/or database instance 200 of FIG. 2. In some embodiments, the primary database service is primary database service 201 of FIG. 2, the secondary database service is secondary database service 211 of FIG. 2, and the compatibility layer is compatibility layer 203 of FIG. 2.

At 501, a tree representation of the query is created. For example, the database query is parsed, and a tree representation of the query is created. In some embodiments, the query tree is an abstract syntax tree or another database tree representation of the query. The query tree representation of the query retains the structure of the query including preserving the ordering of the different components of the query. In various embodiments, the query tree can be traversed to generate the entire query by combining the different query components of the different nodes of the query tree as they are traversed.

At 503, rewrite hooks are attached to the nodes of the query tree. For example, the tree is traversed, and rewrite hooks are attached to the nodes at the appropriate nodes. In some embodiments, the nodes with rewrite hooks are determined by a language rule set. The language rule set is configured to allow certain nodes to be translated and is based on the source and destination languages. For example, a SQL query keyword and usage format that is compatible between two database services does not require a rewrite rule for the applicable query tree node. However, a different SQL query keyword and usage format that is not compatible between two database services does require a rewrite rule for the associated query tree node. As one example, query component referencing an employee database table is properly formatted as 'employee' for a first database service but is incompatible with a second database service and requires translation to "employee" with double quotes replacing the backticks. Similarly, a query component for a table field formatted as 'employee'.'name' for a first database service should be translated to "employee"."name" for a second database service. In various embodiments, complex rewrite hooks and associated rewrite rules can be implemented to address translation of query components. For example, a rewrite hook and associated rewrite rule can utilize references to portions of a source query component and apply substitution patterns and templates to create the translated query component.

At 505, applicable nodes for rewriting are determined and enabled. For example, for each node of the query tree, the nodes that require rewriting are determined and the rewrite hooks are enabled to apply rewrite rules. In some embodiments, the determination is made in part by applying the language rule set and by analyzing the specific query components. In some embodiments, the determination includes identifying operation codes for the query components of a node. For example, a query component can include multiple elements including predefined operation code elements corresponding to query syntax language such as a backtick, a date, a datetime, or a standard function, as examples. These elements are identified as operation code elements. A query node with operation code elements that require translation from the primary to secondary database service language has its rewrite hook enabled. For example, a query node with a query component that includes a backtick is identified to have a backtick operation code. A corresponding rewrite rule associated with the rewrite hook can replace the backtick with a double quote. Similarly, a datetime element of a query component is identified as a datetime operation code and a corresponding rewrite rule can replace the datetime element by applying the translation template CAST(<field> AS TIMESTAMP) where <field> references a portion of the query component in the primary database service language.

At 507, the query tree is traversed and active rewrite hooks are applied. For example, the query tree is traversed and at each visited query node, the node is checked to determine whether a rewrite hook exists and is enabled. In the event the rewrite hook is enabled, the rewrite hook is applied to the query component and any corresponding rewrite rules are applied to translate the query component to the secondary database service language. Nodes that do not have a rewrite hook or that have a disabled rewrite hook do not require translation. At each query node, based on whether the rewrite hook is enabled or disabled, either the translated query component or the original query component is outputted. As the tree is traversed, the output components are combined to create the translated query in the secondary database service language.

At 509, the translated query is returned. For example, once the entire query tree is traversed and each query component is outputted and combined to create a completed translation query in the secondary database service language at 507, the translated query is returned. Now that the translated query is compatible with the secondary database service, the translated query can be routed to the secondary database service for execution.

Figure 6:
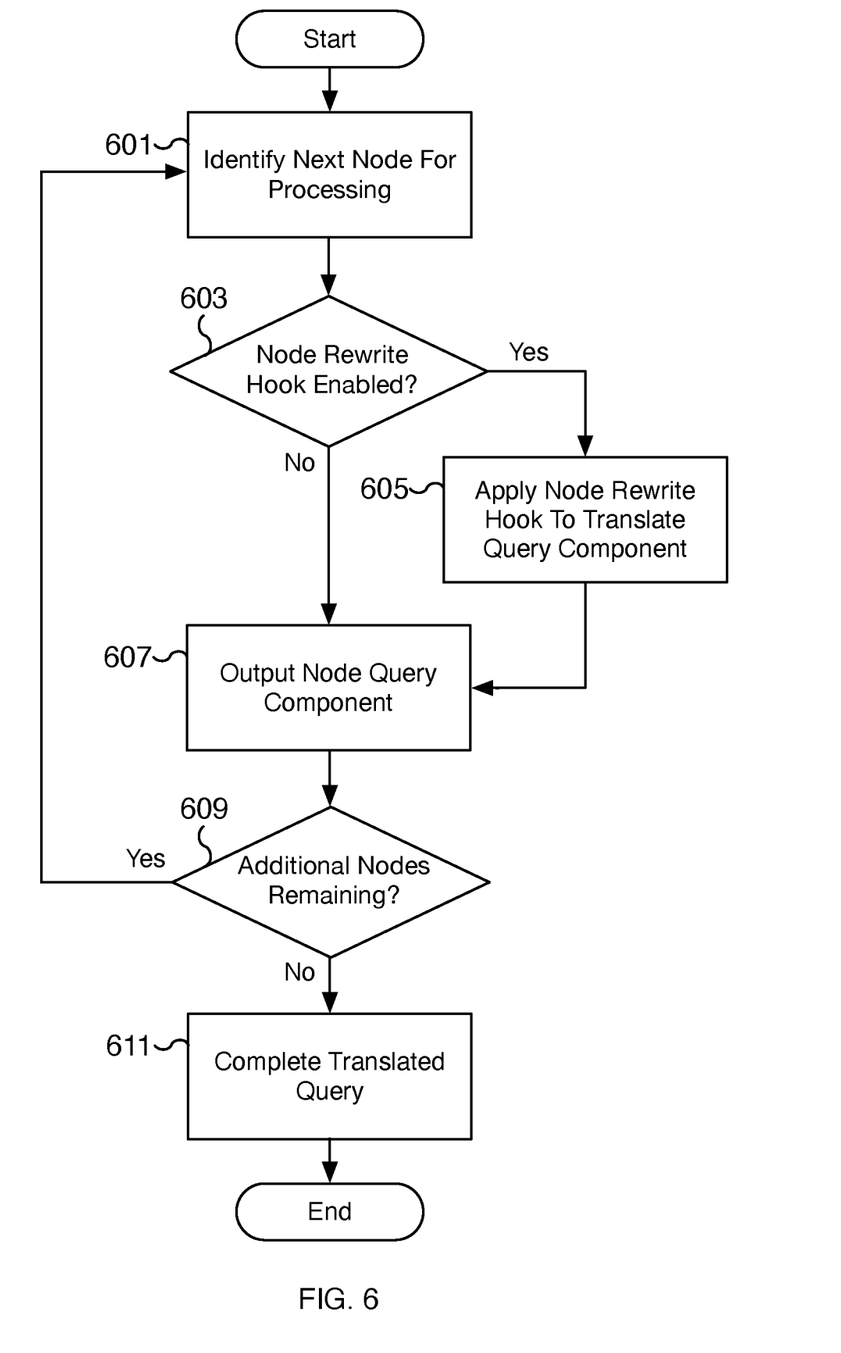
FIG. 6 is a flow chart illustrating an embodiment of a process for traversing a query tree to translate a database query.

FIG. 6 is a flow chart illustrating an embodiment of a process for traversing a query tree to translate a database query. Using the process of FIG. 6, a compatibility layer of a database instance translates a query represented as a query tree from a primary database service language into a secondary database service language. In various embodiments, the query tree is created by parsing the query to create a tree representation of the query. For the nodes of the query tree that require translation, rewrite hooks are attached and enabled with rewrite rules. In some embodiments, the rewrite hooks are enabled based on a configured language rule set used for translation. In some embodiments, the process of FIG. 6 is performed at 405 of FIG. 4 and/or at 507 of FIG. 5 by a compatibility layer of a database instance. In some embodiments, the database instance is database instance 123 of FIG. 1 and/or database instance 200 of FIG. 2. In some embodiments, the primary database service is primary database service 201 of FIG. 2, the secondary database service is secondary database service 211 of FIG. 2, and the compatibility layer is compatibility layer 203 of FIG. 2.

At 601, the next node of the query tree is identified for processing. For example, the processing can begin at the root node until each node of the query tree is visited. In various embodiments, different tree traversal techniques are appropriate, and the appropriate traversal technique is applied based on the format of the database tree representation.

At 603, a determination is made whether the identified node has a rewrite hook enabled. In the event the identified node has a rewrite hook enabled, processing continues to 605 where the rewrite hook and corresponding rewrite rules are applied to translate the query component of the identified node. In the event the identified node does not have a rewrite hook enabled, processing continues to 607 and the rewrite hook is not applied since the query component does not need translation.

At 605, the rewrite hook is applied to translate the query component of the identified node. For example, since the rewrite hook of the identified query node is enabled, the rewrite hook is applied to the query component of the query node. Any corresponding rewrite rules associated with the rewrite hook are applied. The rewrite rules translate the query component to the secondary database service language. In some embodiments, the rewrite rules are applied to any operation code elements of the query component. An operation code element can correspond to query syntax language identified in the query component, such as a backtick, a date, a datetime, or a standard function, as examples. For example, a rewrite rule can replace backticks with double quotes as part of translating the database query. As another example, a rewrite rule for a datetime element can replace the datetime element by applying the translation template CAST(<field> AS TIMESTAMP) where <field> references a portion of the query component in the primary database service language.

At 607, the query component of the identified node is outputted. The output of a node can be the original query component in the primary database service language that is also compatible with the secondary database service language or, in the event a rewrite hook was applied at 605, the output is a translated version of the query component in the secondary database service language. In various embodiments, as the query tree is traversed, each query node outputs a query component at 607 until each node has been visited and a complete translation of the database query can be created by combining the various outputs based on the order of traversal.

At 609, a determination is made whether additional nodes remain. In the event additional nodes remain, processing loops back to step 601. In the event no additional nodes remain, processing proceeds to step 611.

At 611, the translated query is completed. For example, now that the entire query tree has been traversed and each node has outputted either the original or translated query components, the outputs of each node are combined to construct the entire translated query. In some embodiments, the output is combined piecemeal as each node is visited and the final translated query is completed when the last node is visited. In various embodiments, the translated query is now in a format that is compatible with the secondary database service.

Figure 7:
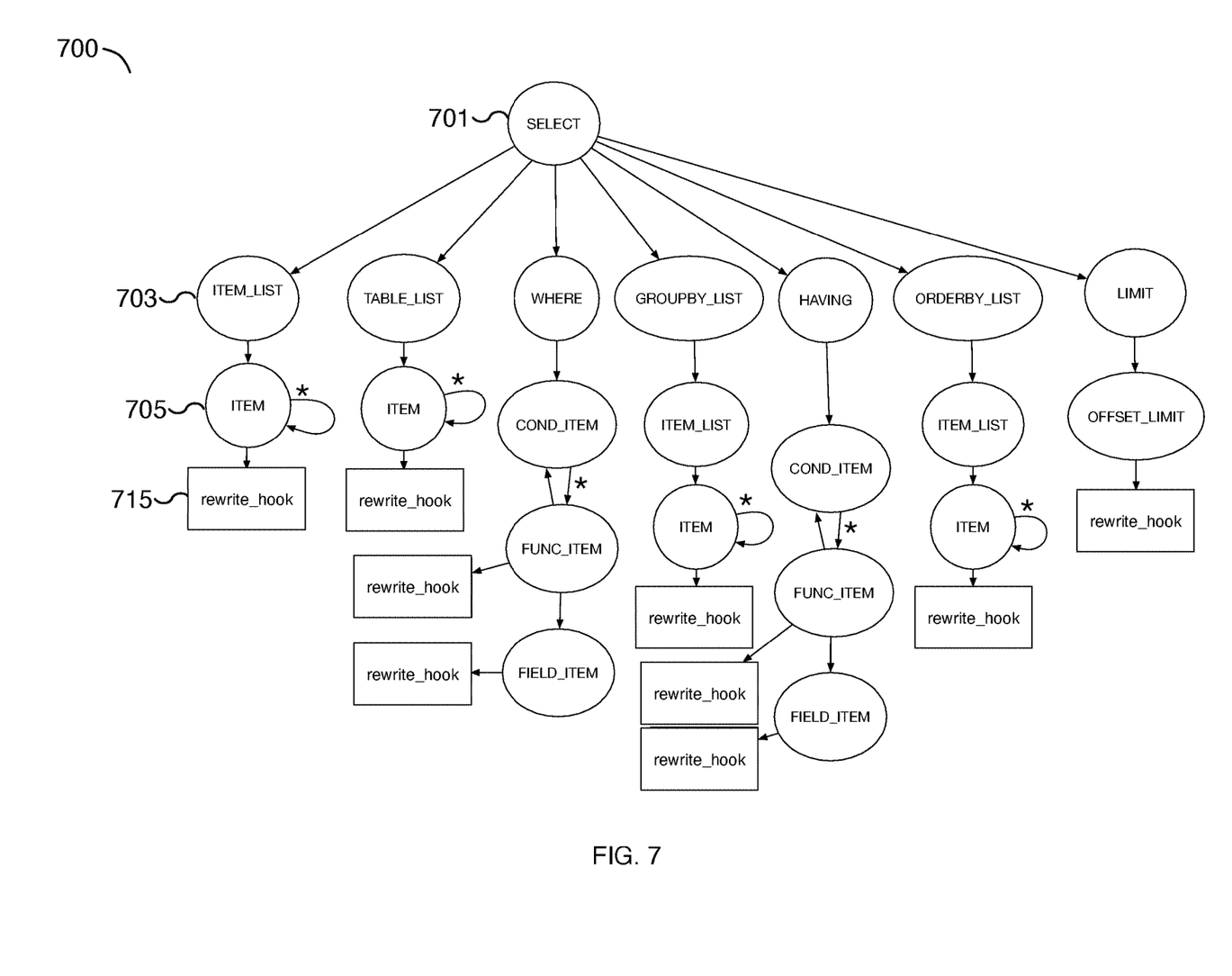
FIG. 7 is a diagram illustrating an embodiment of a query tree used for translating a database query between different database query languages.

FIG. 7 is a diagram illustrating an embodiment of a query tree used for translating a database query between different database query languages. In the example shown, query tree 700 is a tree representation of a SELECT database query created using the processes of FIGS. 3-5 including specifically the steps 501, 503, and/or 505 of FIG. 5. In various embodiments, query tree 700 is used to translate a database query from a primary database service language to a secondary database service language. Query tree 700 can be traversed as described with respect to the process of FIG. 6 to output a translated database query in the secondary database service language. In some embodiments, query tree 700 is created by a compatibility layer of a database instance after a determination is made that a secondary database service of the database instance should process the query instead of the primary database service. In some embodiments, the database instance is database instance 123 of FIG. 1 and/or database instance 200 of FIG. 2. In some embodiments, the primary database service is primary database service 201 of FIG. 2, the secondary database service is secondary database service 211 of FIG. 2, and the compatibility layer is compatibility layer 203 of FIG. 2.

In the example shown, query tree 700 includes the query nodes corresponding to the different components of the query. The nodes of query tree 700 include nodes 701, 703, and 705 along with additional nodes not labeled with a number. Query tree 700 also includes rewrite hooks attached to various nodes such as rewrite hook 715 attached to node 705. As with the nodes, additional rewrite hooks are shown not labeled with a number. With respect to nodes 701, 703, and 705, node 701 is the root node of query tree 700 and is labeled SELECT. Node 703 is an internal node of query tree 700 and is labeled ITEM_LIST. Node 703 has node 701 as a parent and node 705 as a child. Node 705 is a leaf node of query tree 700 and is labeled ITEM. In the example shown, each node is labeled with a node type associated with the query language, such as SELECT for the node 701, ITEM_LIST for node 703, and ITEM for node 705. Additional example node types include the types TABLE_LIST, WHERE, GROUPBY_LIST, HAVING, ORDERBY_LIST, LIMIT, COND_ITEM, FUNC_ITEM, FIELD_ITEM, and OFFSET_LIMIT, among others. Each node corresponds to a query component of the complete query. For example, node 703 corresponds to a query component that is an ITEM_LIST. The actual query language is not shown in FIG. 7. For example, the SQL query language corresponding to the ITEM_LIST of node 703 is not shown. Similarly, the rewrite rules associated with each rewrite hook and the associated enable/disable setting for the rewrite hook are not shown. In various embodiments, additional data associated with the nodes, rewrite hooks, and other aspects of query tree 700 such as operation code elements are not shown but may exist.

In the example shown, only a portion of the nodes of query tree 700 have a rewrite hook attached. For example, nodes 701 and 703 do not have rewrite hooks attached to them and thus do not require translation. When traversed to output the translated query, nodes without rewrite hooks output the original query component, which is already compatible with the secondary database service. In contrast, nodes with rewrite hooks attached may require translation, such as node 705 with rewrite hook 715 attached. In the event the rewrite hook is enabled, the rewrite rules associated with the rewrite hook are applied to the query component of the node. For example, a rewrite rule can translate a portion of the query component for a node such as transforming all backticks to double quotes. In some embodiments, a rewrite rule applies a translation template. In various embodiments, each node of query tree 700 can contain a list of operation code elements (not shown). An operation code element can correspond to query syntax language such as a backtick, a date, a datetime, or a standard function, as examples. Each operational code is associated with a rewrite rule that when applied can translate and output the operation code element to the target database service language. In various embodiments, as the nodes of query tree 700 are traversed using the process of FIG. 6, each node can output its corresponding query component compatible with the secondary database service. Nodes that require translation have an enabled rewrite hook and utilize the associated rewrite rules to perform the required translation. Once all the nodes have been visited, the output of each node is combined to create the completed query translated for execution by the secondary database service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving at a primary database a database query in a query language of the primary database;
   determining whether the database query is to be handled by a secondary database different from the primary database but storing synchronized records of at least a portion of the primary database;
   in response to determining that the database query is to be handled by the secondary database, translating the database query to a query language of the secondary database, including by determining a tree data structure representation of the database query and translating one or more elements of the tree data structure representation and synthesizing the tree data structure representation to automatically generate the database query in the query language of the secondary database, wherein determining the tree data structure representation of the database query includes attaching a rewrite hook and associated rewrite rules to a node of the tree data structure representation of the database query, wherein the rewrite hook and associated rewrite rules comprise rules for translating at least one query component to the query language of the secondary database; and
   providing the automatically generated database query in the query language of the secondary database to the secondary database.

2. The method of claim 1, wherein the rewrite hook includes an enable setting associated with applying the associated rewrite rules.

3. The method of claim 1, wherein translating the database query to the query language of the secondary database includes traversing the tree data structure representation and identifying each node of the tree data structure representation with an enabled rewrite hook.

4. The method of claim 3, further comprising for each identified node of the tree data structure representation with the enabled rewrite hook, applying one or more rewrite rules associated with the rewrite hook.

5. The method of claim 1, further comprising:
   executing the automatically generated database query utilizing the secondary database;
   identifying database records modified by the execution of the automatically generated database query, wherein the identified database records belong to the synchronized records of at least the portion of the primary database; and
   updating data records of the primary database that correspond to the identified database records.

6. The method of claim 1, further comprising analyzing the database query and selecting the secondary database to process the database query rather than the primary database.

7. The method of claim 6, wherein analyzing the database query includes determining a number of projections of the database query.

8. The method of claim 6, wherein analyzing the database query includes determining a number of aggregate functions of the database query.

9. The method of claim 6, wherein analyzing the database query includes:
   determining a first resource load of the primary database for executing the database query and a second resource load of the secondary database for executing the database query; and
   comparing the first resource load and the second resource load.

10. A system, comprising:
    one or more processors; and
    a memory coupled to the one or more processors, wherein the memory is configured to provide the one or more processors with instructions which when executed cause the one or more processors to:
    receive at a primary database a database query in a query language of the primary database;

determine whether the database query is to be handled by a secondary database different from the primary database but storing synchronized records of at least a portion of the primary database;

in response to determining that the database query is to be handled by the secondary database, translate the database query to a query language of the secondary database, including by determining a tree data structure representation of the database query and translating one or more elements of the tree data structure representation and synthesizing the tree data structure representation to automatically generate the database query in the query language of the secondary database, wherein determining the tree data structure representation of the database query includes attaching a rewrite hook and associated rewrite rules to a node of the tree data structure representation of the database query, wherein the rewrite hook and associated rewrite rules comprise rules for translating at least one query component to the query language of the secondary database; and provide the automatically generated database query in the query language of the secondary database to the secondary database.

11. The system of claim 10, wherein the rewrite hook includes an enable setting associated with applying the associated rewrite rules.

12. The system of claim 10, wherein translating the database query to the query language of the secondary database includes traversing the tree data structure representation and identifying each node of the tree data structure representation with an enabled rewrite hook.

13. The system of claim 12, wherein the memory is further configured to provide the one or more processors with instructions which when executed cause the one or more processors to: for each identified node of the tree data structure representation with the enabled rewrite hook, apply one or more rewrite rules associated with the rewrite hook.

14. The system of claim 10, wherein the memory is further configured to provide the one or more processors with instructions which when executed cause the one or more processors to:

execute the automatically generated database query utilizing the secondary database;

identify database records modified by the execution of the automatically generated database query, wherein the identified database records belong to the synchronized records of at least the portion of the primary database; and update data records of the primary database that correspond to the identified database records.

15. The system of claim 10, wherein the memory is further configured to provide the one or more processors with instructions which when executed cause the one or more processors to analyze the database query and select the secondary database to process the database query rather than the primary database.

16. The system of claim 15, wherein analyzing the database query includes determining a number of projections of the database query.

17. The system of claim 15, wherein analyzing the database query includes determining a number of aggregate functions of the database query.

18. A computer program product, the computer program product being embodied in a non-transitory computer readable storage medium and comprising computer instructions for:

receiving at a primary database a database query in a query language of the primary database;

determining whether the database query is to be handled by a secondary database different from the primary database but storing synchronized records of at least a portion of the primary database;

in response to determining that the database query is to be handled by the secondary database, translating the database query to a query language of the secondary database, including by determining a tree data structure representation of the database query and translating one or more elements of the tree data structure representation and synthesizing the tree data structure representation to automatically generate the database query in the query language of the secondary database, wherein determining the tree data structure representation of the database query includes attaching a rewrite hook and associated rewrite rules to a node of the tree data structure representation of the database query, wherein the rewrite hook and associated rewrite rules comprise rules for translating at least one query component to the query language of the secondary database; and providing the automatically generated database query in the query language of the secondary database to the secondary database.

* * * * *